US012668252B2

(12) United States Patent　　　　(10) Patent No.:　US 12,668,252 B2

Freienstein et al.　　　　　　　　　(45) Date of Patent:　Jun. 30, 2026

(54) ERROR-TOLERANT DATA PROCESSING SYSTEM

(71) Applicant: Robert Bosch GmbH, Stuttgart (DE)

(72) Inventors: Heiko Freienstein, Weil der Stadt (DE); Joerg Moennich, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 275 days.

(21) Appl. No.: 18/522,681

(22) Filed: Nov. 29, 2023

(65) Prior Publication Data

US 2024/0190449 A1　　Jun. 13, 2024

(30) Foreign Application Priority Data

Dec. 7, 2022　(DE) ..................... 10 2022 213 178.9

(51) Int. Cl.
　　*B60W 50/02*　　　(2012.01)
　　*B60W 50/00*　　　(2006.01)
　　*B60W 50/029*　　(2012.01)

(52) U.S. Cl.
　　CPC .... *B60W 50/0205* (2013.01); *B60W 50/0097* (2013.01); *B60W 2050/0292* (2013.01)

(58) Field of Classification Search
　　CPC ..... B60W 2050/0292; B60W 50/0097; B60W 50/0205; G06F 11/1629
　　See application file for complete search history.

(56) References Cited

U.S. PATENT DOCUMENTS

2021/0163021 A1 *　6/2021　Frazzoli .............. B60W 50/023

* cited by examiner

*Primary Examiner* — Wade Miles
*Assistant Examiner* — Zachary Joseph Wallace
(74) *Attorney, Agent, or Firm* — NORTON ROSE FULBRIGHT US LLP

(57) ABSTRACT

An error-tolerant data processing system for generating safe behavior of an automatically operable vehicle. The data processing system includes at least two hardware modules which are used in a redundant operating mode to generate results for a specified task independently of one another. At least one complementary operating mode is provided, in which the at least two hardware modules are used to generate results for different subtasks in each case. At least one switching component is provided for specifying the current operating mode.

9 Claims, 2 Drawing Sheets

10

20

ERROR-TOLERANT DATA PROCESSING SYSTEM

CROSS REFERENCE

The present application claims the benefit under 35 U.S.C. § 119 of German Patent Application No. DE 10 2022 213 178.9 filed on Dec. 7, 2022, which is expressly incorporated herein by reference in its entirety.

FIELD

The present invention relates to an error-tolerant data processing system for generating safe behavior of an automatically operable vehicle. The data processing system in question here comprises at least two hardware modules, which are used in a redundant operating mode to generate results for a specified task independently of one another.

BACKGROUND INFORMATION

Typical tasks from the field of automated driving are the formation of an environment model for the current traffic scene, the prediction of possible developments of the current traffic scene, in particular the prediction of the behavior of the individual road users, and the determination of trajectories for the EGO vehicle, which can then be traversed by corresponding control of the actuator system of the EGO vehicle. For all such tasks, large amounts of data must be processed and merged in a very short time from different data sources, such as sensor data, map information, position data, etc. High computing power is required for this purpose.

The starting point of the present invention is a data processing system 10 having a safety architecture, as shown in FIG. 1. Accordingly, the data processing system 10 comprises two hardware modules A and A' for processing largely identical parts of a specified task, for example object recognition within the scope of the formation of an environment model. The two hardware modules A and A' are used here, independently of one another, to generate results for the specified task. For this purpose, a corresponding software SWA and SWA' runs on each of the two hardware modules A and A'. In error-free operation, the two hardware modules A and A' should thus supply redundant results for the specified task.

The data processing system 10 further comprises a combination module B, which combines and compares the results of the two hardware modules A and A', which allows conclusions to be drawn about the error protection of the results. The safety architecture of the data processing system 10 shown here thus provides two independent hardware/software branches A/SWA and A'/SWA' for parallel processing of a task, in order to increase the safety of the overall system against hardware-induced errors through a suitable combination of the results obtained independently of one another.

In the simplest case, both hardware modules A and A' are configured identically and the identical software is used for processing the specified task on the two hardware modules A and A'. In this case, both branches A/SWA and A'/SWA' of the data processing system 10 require identical input data input A=input A' and provide identical results in the event of error-free operation.

However, the fail-safety of the overall system could also be increased by processing the specified task in the two branches A/SWA and A'/SWA' of the data processing system 10 in different ways. If the specified task is object recognition, for example, then object recognition based on lidar, radar and camera data could be carried out in one branch A/SWA, while in the other branch A'/SWA' only lidar data are used for object recognition. In this case, different evaluation algorithms are used in the two branches A/ASW and A'/SWA', which also require different input data input A≠input A'. Nevertheless, the two branches A/SWA and A'/SWA' should produce the same results in error-free operation, such that redundancy is provided to increase fail-safety.

The example of object recognition illustrates the fact that the two hardware modules A and A' do not necessarily have to be configured identically. In particular, if the specified task is processed in the two branches A/SWA and A'/SWA' with different approaches, the two hardware modules A and A' can differ significantly in their processor equipment, memory capacity, interfaces, etc.

Within the framework of the redundant safety architecture described above, the computing power and capacities of the two hardware modules A and A' are used for largely identical parts of a specified task, in order to fulfill certain safety requirements for this task, for example in accordance with ASIL (Automotive Safety Integrity Level), the safety requirement levels specified by ISO 26262 for safety-related systems in motor vehicles.

However, in practice, situations may arise in which the original task is replaced by a new task with different safety requirements, but which requires significantly higher computing power in the shortest possible time than the original task. One example of this is a "pre-crash situation". This refers to a situation in which the surrounding situation is assessed as critical, for example because the EGO vehicle has fallen below or is very likely to fall below a minimum spatial and/or temporal distance to another road user. Such a situation requires a rapid reaction and an evasive maneuver to avoid or at least mitigate a collision. In this situation, the calculation of a suitable emergency trajectory has top priority. The safety requirement of this situation can also be fulfilled without the duplication described above.

The safety architecture described above does not offer the option of making the available hardware resources available dynamically, i.e., adapted to the respective situation and task. This safety architecture always provides for redundant or parallel processing of the respective task.

SUMMARY

The present invention provides dynamic utilization of the hardware resources of a data processing system with a redundant safety architecture. According to the present invention, the hardware modules, which are used redundantly in the standard case in order to fulfill the safety requirements of the respective task, can also be used elsewhere in certain situations and constellations while fulfilling a different safety requirement for the situation.

According to an example embodiment of the present invention, this may be achieved by the error-tolerant data processing system being operable in at least two different operating modes, specifically in a redundant operating mode and in at least one complementary operating mode. The current operating mode is specified with the aid of a switching component of the data processing system according to the present invention. While the at least two hardware modules are used in the redundant operating mode to generate results for a specified task independently of one another, the at least two hardware modules are used in the at least one complementary operating mode to generate results for different subtasks in each case.

According to an example embodiment of the present invention, the subtasks of the complementary operating mode can be subtasks of the specified task of the redundant operating mode or also subtasks of another, new overall task of the complementary operating mode. It is essential that the at least two hardware modules are not used in a complementary operating mode to process one and the same task, but to process different subtasks, the results of which are combined to produce an overall result. In a complementary operating mode, the at least two hardware components are therefore used with as little redundancy as possible by defining the subtasks in a suitable manner and distributing them between the at least two hardware components. This means that a given task can be processed more extensively or more rapidly than in the redundant operating mode, since a larger amount of data can be processed in the same time or a specified amount of data can be processed in a shorter time.

At this point, it should be expressly pointed out that the data processing system according to the present invention can in principle provide a plurality of different complementary operating modes, each of which can be configured for different exceptional situations or constellations. This is illustrated once again below in conjunction with the description of the exemplary embodiments. Furthermore, the data processing system according to the present invention can also provide a plurality of different redundant operating modes if it has more than two hardware modules that can be used either redundantly or complementarily. In such cases, different redundant operating modes could be realized by different combinations of redundant and/or complementary hardware modules.

Furthermore, it should be noted that the switching component is defined functionally in the context of the present invention. Since the component is preferably realized on a software basis, it cannot be clearly localized in the data processing system according to the present invention, unlike the at least two hardware modules.

In an advantageous further development of the data processing system according to the present invention, the switching component monitors at least one switchover condition for a switchover between two different operating modes in each case and causes a switchover between these two operating modes if the at least one switchover condition is fulfilled. For this purpose, for example, the switching component could be realized in the form of a state machine whose states are formed by the different operating modes of the data processing system. The transitions between such states are then described by the respective switchover conditions. Such a switching component can also simply monitor a plurality of switchover conditions and thus control the switchover between a plurality of possible operating modes. For example, the detection or recognition of an unforeseen event or an emergency situation could act as a switchover condition. The failure or malfunction of individual sensor components that supply data for environment modeling could also be defined as a switchover condition.

According to an example embodiment of the present invention, the task specified in the redundant operating mode and the different subtasks of the at least one complementary operating mode are preferably implemented in the form of corresponding software modules in the at least two hardware modules. Such software modules are then processed as a function of the current operating mode. This can be achieved simply by the switching component setting a corresponding decision parameter to specify the current operating mode, which is queried at a program branch, such that only the software modules of the current operating mode are processed.

As already indicated above, it must be ensured that all necessary input data are available to the software modules to be processed in the current operating mode in the respective hardware modules. Advantageously, according to an example embodiment of the present invention, this is also performed with the aid of the switching component. For example, setting a decision parameter to specify the current operating mode could also trigger the assignment of the input data required for the current operating mode to the respective hardware modules.

In a particularly advantageous embodiment of the present invention, the data processing system according to the present invention comprises at least one combination module for combining the results of the respective hardware modules. In the redundant operating mode, this combination module combines the independently generated results for the specified task, which serves to increase the fail-safety of the system. In complementary operating mode, it combines the results generated by the individual hardware modules for the different subtasks into an overall result, namely an overall result for the task on which the complementary operating mode is based.

In a further development of the present invention, the data processing system comprises, in addition to the at least two redundantly usable hardware modules, at least one further hardware module to which a further subtask can be assigned in at least one complementary operating mode, such that the further hardware module is used in this complementary operating mode to generate partial results for the underlying overall task. This allows the functional scope and performance of the data processing system to be extended in at least one complementary operating mode via the computing capacity of the hardware components that can be used redundantly.

In a preferred embodiment of the data processing system according to the present invention, the switching component is designed to recognize the occurrence and end of an error/failure situation. This error/failure situation could relate to individual sensor components, i.e., data sources for environment modeling, but also to other software or hardware components of the overall system for generating a safe behavior of an automated vehicle. The switching component is also designed here to effect a switchover from a redundant operating mode to a complementary operating mode when an error/failure situation occurs and to effect a switchover from the complementary operating mode to a redundant operating mode when the error/failure situation ends.

In a further preferred embodiment of the data processing system according to the present invention, the switching component is designed to detect the occurrence and end of an exceptional situation, in particular a pre-crash situation, a minimum risk maneuver and/or an emergency braking action. In such a case, the switching component causes a switchover from a redundant operating mode to a complementary operating mode when the exceptional situation occurs and a switchover from the complementary operating mode to a redundant operating mode when the exceptional situation ends.

DETAILED DESCRIPTION OF EXAMPLE EMBODIMENTS

Figure 1:
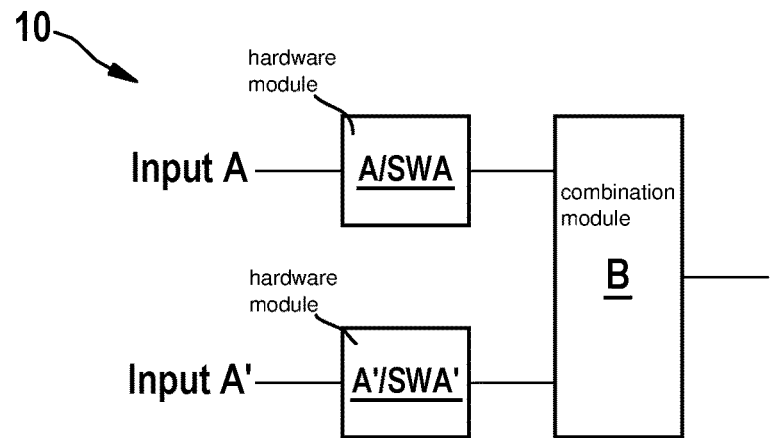
FIG. 1 illustrates the safety architecture of a data processing system 10 according to the related art.
Figure 2:
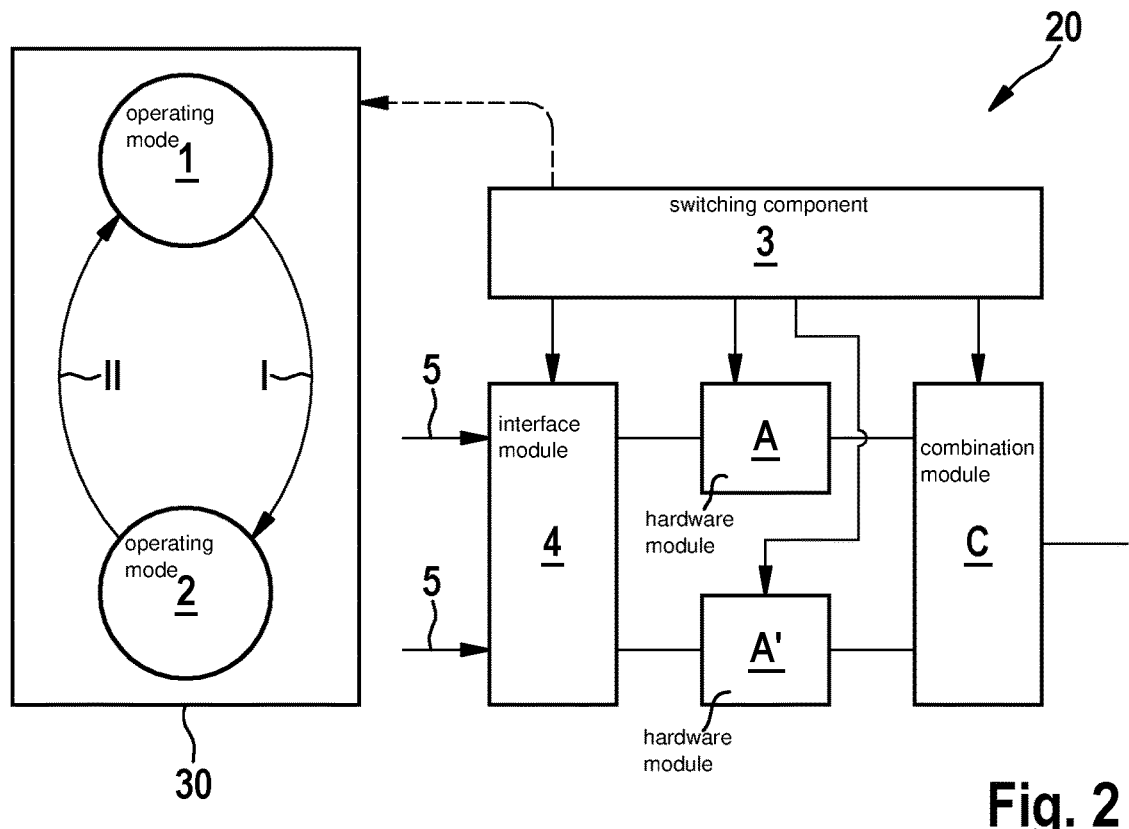
FIG. 2 illustrates the system architecture of a data processing system 20 according to an example embodiment of the present invention.

The system architecture of the data processing system 20 shown in FIG. 2 is based on the safety architecture of the data processing system 10 from the related art, which was explained at the beginning in connection with FIG. 1. The data processing system 20 also comprises two hardware modules A and A', but unlike the data processing system 10, these can be used in two different operating modes 1 or 2. In a first, redundant operating mode 1, the two hardware modules A and A' are used to generate results for a specified task independently of one another in order to increase the security of the system against hardware-related errors. The redundant operating mode 1 corresponds to the realization of the data processing system 10. In the second, complementary operating mode 2, each of the two hardware modules A and A' only processes one part of an overall task, and namely different parts, such that the results of the individual hardware modules A and A' supplement one another and contribute to an overall result. Redundancy of the partial results is not aimed for in complementary operating mode 2.

The data processing system 20 also comprises a switching component 3, which specifies the current operating mode 1 or 2. For this purpose, the switching component 3 monitors two switchover conditions I and II for a switchover between operating modes 1 and 2 in the exemplary embodiment described here. If the system is in the redundant operating mode 1, the switching component 3 monitors the first switchover condition I for the switchover to the complementary operating mode 2. For the switchover from the complementary operating mode 2 back to the redundant operating mode 1, the switching component 3 monitors the second switchover condition II. The switching component 3 causes a switchover between operating modes 1 and 2 always when, but only if, the respective relevant monitored switchover condition I or II is fulfilled. The action of the switching component 3 required for this purpose in the hardware modules A and A' is indicated in FIG. 2 by corresponding arrows between such components.

The mode of operation of the switching component 3 corresponds to that of a state machine, the state diagram 30 of which is shown in the left-hand half of FIG. 2. The two operating modes 1 and 2 form the states 1 and 2 and the transitions I and II between these states 1 and 2 are described by the switchover conditions I and II.

In the exemplary embodiment shown in FIG. 2, it is ensured with the aid of the switching component 3 that the respective hardware modules A and A' have all the necessary input data for the current operating mode 1 or 2. For this purpose, the data processing system 20 comprises an interface module 4, which is controlled via the switching component 3 and which, as a function of the current operating mode 1 or 2, either forwards the input data 5 of the system to both hardware modules A and A' (redundant operating mode 1) or distributes the data to the two hardware modules A and A' according to the respective subtasks (complementary operating mode 2).

Furthermore, the data processing system 20 also comprises a combination module C, which is also controlled by the switching component 3, such that it also performs different functions in the different operating modes 1 and 2. In the redundant operating mode 1, it carries out a comparison and, optionally, a selection of the independently generated results for the specified task and thus contributes to increasing the fail-safety of the system. In complementary operating mode, it combines the results generated by the individual hardware components A and A' for the different subtasks and generates an overall result for the task on which the complementary operating mode is based.

The data processing system 20 could, for example, be used within the framework of trajectory planning. For this purpose, all available environmental data are evaluated in order to generate an environment model of the current traffic scene. Such environmental data form the input data 5 of the system. One task within the framework of environment modeling is object recognition. Here, the hardware components A and A' should both be used for this task in order to generate redundant results for object recognition. For this reason, in the redundant operating mode 1, software modules that perform object recognition on the basis of the input data 5 are processed in parallel and independently of one another on both hardware components A and A'. In doing so, the interface module 4 ensures that the required input data 5 are also available to the respective software modules. The combination module C then compares the results of the two calculation branches.

At the same time, the switching component 3 monitors whether a "pre-crash situation" exists, i.e., whether the distance to another participant in the traffic scene has fallen below a minimum spatial or temporal distance. If such an exceptional situation occurs and both hardware modules A and A' are fully functional, the switching component 3 causes a switchover from the redundant operating mode to a complementary operating mode 2. For this purpose, it sets a corresponding decision parameter, which is queried by the interface module 4, the hardware modules A and A' as well as the combination module C.

The task of the complementary operating mode 2 could be to calculate an emergency trajectory for an evasive maneuver. This new task is processed with the aid of corresponding software modules, which are distributed across the two hardware components A and A' and each process only part of the task, i.e., only deliver partial results. The partial results are then combined into an overall result with the aid of the combination module C. This division of labor results in higher performance, for example a shorter cycle time, which reduces latencies and response times.

As an alternative or in addition to the switchover condition described above, the switching component 3 could also monitor whether a minimum risk maneuver or an emergency braking action is initiated and evaluate this as a condition for switching over to a further complementary operating mode. In such a case, the system could analyze the situation in the other complementary operating mode in a higher cycle of a few ms, while the minimum risk or emergency braking trajectory is implemented in order to, optionally, determine and trigger an improved trajectory.

Figure 3:
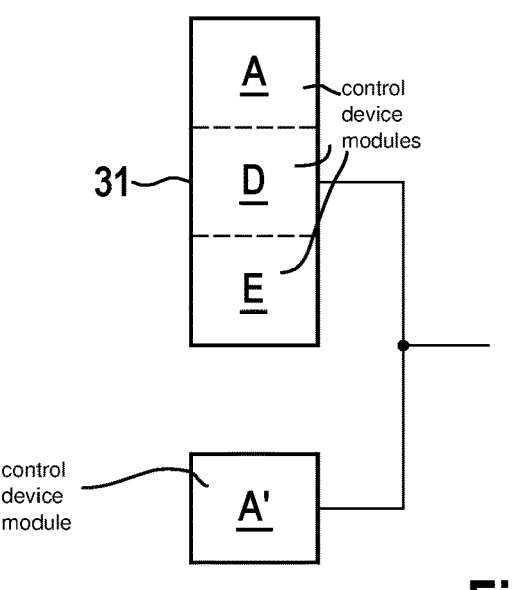
FIG. 3 illustrates a variant of the system architecture shown in FIG. 2.

FIG. 3 illustrates an exemplary embodiment of the present invention, in which a plurality of control device modules A, D and E are integrated in a primary control device 31 of a vehicle. On account of the ASIL classification, the control device module A is designed to be redundant owing to a further control device A'. If the vehicle now enters a driving state in which a lower ASIL classification is permissible without redundancy, such as in a threatened pre-crash situation, the previously redundant systems A and A' can be used in a complementary operating mode such that they share a new common computing task. The other control device modules D and E, which are responsible for non-safety-related functions in the redundant operating mode, for example, can also be used in the complementary operating mode to process parts of the new common calculation task, in order to significantly improve performance. In the application example, the computing power of a conventional system with redundant control device modules A and A' could be more than doubled by a system with control device modules A+D+E+A' in the complementary operating mode, in order to, optionally, mitigate or prevent an impending accident.

Figure 4:
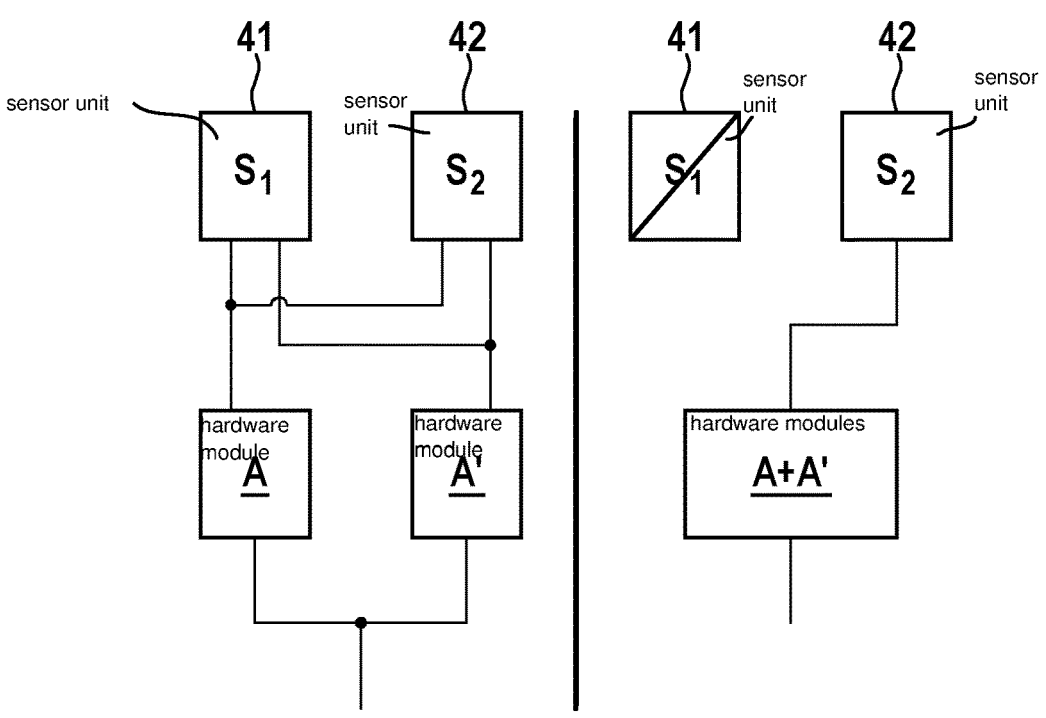
FIG. 4 illustrates a redundant operating mode and a complementary operating mode of a data processing system according to an example embodiment of the present invention.

The left-hand half of the image in FIG. 4 illustrates the redundant operating mode of a data processing system according to the present invention with two hardware modules A and A', while the right-hand half of the image illustrates a complementary operating mode.

In the redundant operating mode, two sensor units 41 and 42 supply sensor data to both hardware modules A and A'. Both hardware modules A and A' process such sensor data independently of one another and thus generate redundant results for a specified task, for example within the framework of environment modeling. If a sensor unit fails or has a confidence level that is too low for a short time, in this case the sensor unit 41, this triggers the switchover to the complementary operating mode shown in the right-hand half of the image in the present exemplary embodiment. The two hardware modules are now both used here to process and evaluate the sensor data from the remaining sensor unit 42. Through such supplemental use of the hardware modules A and A', the failure of the sensor unit 41 and the resulting loss of sensor redundancy can be at least partially compensated for by the significantly higher performance of the overall system in terms of calculation cycles, processing of the sampled values, etc., in order to increase the safety of the system, at least until the sensor redundancy is restored.

The exemplary embodiments discussed above illustrate the fact that data processing systems according to the present invention utilize the advantages of a redundant safety architecture, but in certain situations can also switch over to operation with as little redundancy as possible, in order to utilize the technical capacity of all components as far as possible.

What is claimed is:

1. An error-tolerant data processing system for generating safe behavior of an automatically operable vehicle, the data processing system comprising:

at least two hardware modules comprising a first hardware module and a second hardware module, the at least two hardware modules configured to operate:

in a redundant operating mode to generate results for a specified task independently of one another; and in at least one complementary operating mode in which the first hardware module generates a first result for a first subtask and the second hardware module generates a second result for a second subtask different from the first subtask; and at least one switching component configured to select a current operating mode for the at least two hardware modules, the current operating mode being either the redundant operating mode or the at least one complementary operating mode.

2. The data processing system as recited in claim 1, wherein the switching component is configured to monitor at least one switchover condition for a switchover between at least two different operating modes comprising the redundant operating mode and the at least one complementary operating mode and effects a switchover between the at least two different operating modes when the at least one switchover condition is satisfied.

3. The data processing system as recited in claim 1, wherein the specified task and the different subtasks are implemented in the form of corresponding software modules in the at least two hardware modules, wherein the software modules are processed based on the selected current operating mode.

4. The data processing system as recited in claim 3, wherein, using the switching component, it is ensured that all required input data are available to the software modules to be processed in the current operating mode in the at least two hardware modules.

5. The data processing system as recited in claim 1, further comprising:

at least one combination module, with which:

in the redundant operating mode, the independently generated results for the specified task are combined to increase fail-safety of the automatically operable vehicle, and in the at least one complementary operating mode, the results generated for the different subtasks are combined to produce an overall result.

6. The data processing system as recited in claim 5, further comprising:

at least one further hardware module to which a further subtask is assigned in the at least one complementary operating mode, such that the at least one further hardware module is used in the at least one complementary operating mode to generate partial results and make the partial results available to the combination module.

7. The data processing system as recited in claim 1, wherein the at least one switching component is further configured:

to recognize an occurrence of an error and/or failure situation at a first time and an end of the error and/or failure situation at a second time different from the first time, to effect a switchover from the redundant operating mode to a complementary operating mode of the at least one complementary mode in response to recognizing the occurrence of the error and/or failure situation at the first time, and to effect a switchover from the complementary operating mode to the redundant operating mode in response to recognizing the end of the error and/or failure situation at the second time.

8. The data processing system as recited in claim 1, wherein the at least one switching component is configured:

to recognize an occurrence and an end of an exceptional situation including a pre-crash situation, and/or a minimum risk maneuver and/or an emergency braking action, to effect a switchover from the redundant operating mode to a complementary operating mode of the at least one complementary mode when the exceptional situation occurs, and at the end of the exceptional situation, to effect a switchover from the complementary operating mode to the redundant operating mode.

9. The data processing system as recited in claim 1, further comprising an interface module controlled via the at least one switching component and configured to:

transmit first data associated with the specified task to the at least two hardware modules when the at least one switching component selects the redundant operating mode for the at least two hardware modules; and transmit second data to the first hardware module associated with the first subtask and third data, different from the second data, to the second hardware module associated with the second subtask, wherein the transmitting of the second data and the third data occurs when the at least one switching component selects the at least one complementary operating mode for the at least two hardware modules.

\*   \*   \*   \*   \*